US010991389B2

(12) United States Patent
Hall

(10) Patent No.: US 10,991,389 B2
(45) Date of Patent: Apr. 27, 2021

(54) DATA STORAGE DEVICE COUPLING/DECOUPLING ACTUATOR ARM TO/FROM AN ACTUATOR

(71) Applicant: Western Digital Technologies, Inc., San Jose, CA (US)

(72) Inventor: David R. Hall, Rochester, MN (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/950,117

(22) Filed: Nov. 17, 2020

(65) Prior Publication Data

US 2021/0082460 A1     Mar. 18, 2021

Related U.S. Application Data

(62) Division of application No. 16/750,329, filed on Jan. 23, 2020, now Pat. No. 10,872,629.

(60) Provisional application No. 62/814,393, filed on Mar. 6, 2019.

(51) Int. Cl.
*G11B 5/55* (2006.01)
*G11B 5/596* (2006.01)
*G11B 5/48* (2006.01)

(52) U.S. Cl.
CPC ............ *G11B 5/556* (2013.01); *G11B 5/5573* (2013.01); *G11B 5/59688* (2013.01); *G11B 5/484* (2013.01); *G11B 5/4813* (2013.01); *G11B 5/4826* (2013.01); *G11B 5/5578* (2013.01)

(58) Field of Classification Search
None
See application file for complete search history.

(56) References Cited

U.S. PATENT DOCUMENTS

| 5,745,319 | A | * | 4/1998 | Takekado | G11B 5/4813 360/78.05 |
|---|---|---|---|---|---|
| 6,002,549 | A | * | 12/1999 | Berman | B24B 37/048 360/294.4 |
| 6,005,743 | A | | 12/1999 | Price et al. | |
| 6,278,583 | B1 | * | 8/2001 | Adley | G11B 5/4813 360/244.1 |
| 6,522,494 | B1 | * | 2/2003 | Magee | G11B 5/59633 360/75 |
| 6,538,836 | B1 | * | 3/2003 | Dunfield | G11B 5/5552 360/75 |

(Continued)

FOREIGN PATENT DOCUMENTS

| CN | 1434972 A | 8/2003 |
|---|---|---|
| CN | 1582470 A | 2/2005 |

(Continued)

*Primary Examiner* — Tan X Dinh

(57) ABSTRACT

A data storage device is disclosed comprising a first head connected to a distal end of a first actuator arm, a second head connected to a distal end of second first actuator arm, a first coupler configured to couple the first actuator arm to an actuator, and a second coupler configured to couple the second actuator arm to the actuator. Access commands stored in a command queue are sorted into an execution order based on a selective coupling of the first and second actuator arms to the actuator. At least one of the access commands is executed based on the execution order in order to access at least one of a first and second disk surfaces using at least one of the first and second heads.

10 Claims, 11 Drawing Sheets

(56) References Cited

U.S. PATENT DOCUMENTS

| | | | |
|---|---|---|---|
| 6,541,931 B2 * | 4/2003 | Ho | G11B 5/5552 318/560 |
| 6,560,075 B2 | 5/2003 | Price et al. | |
| 6,847,504 B1 | 1/2005 | Bennett et al. | |
| 7,440,234 B1 | 10/2008 | Cheng et al. | |
| 8,553,349 B2 | 10/2013 | Park et al. | |
| 9,361,919 B1 | 6/2016 | Lieu et al. | |
| 9,741,379 B1 | 8/2017 | Hanson et al. | |
| 9,792,938 B1 | 10/2017 | Kobayashi et al. | |
| 10,014,018 B1 | 7/2018 | Kiyonaga et al. | |
| 10,186,286 B2 | 1/2019 | Keshavan | |
| 10,192,575 B1 | 1/2019 | Resh | |
| 10,410,657 B1 * | 9/2019 | Zhou | G11B 21/10 |
| 10,431,257 B1 | 10/2019 | Ehrlich | |
| 10,872,629 B2 * | 12/2020 | Hall | G11B 5/5573 |
| 10,930,310 B1 * | 2/2021 | Uchida | G11B 5/5578 |
| 2001/0015866 A1 * | 8/2001 | Nakagawa | G11B 5/5552 360/62 |
| 2001/0024340 A1 * | 9/2001 | Masuda | G11B 5/5526 360/77.02 |
| 2001/0036034 A1 * | 11/2001 | Chang | G11B 5/5556 360/78.05 |
| 2002/0036860 A1 * | 3/2002 | Bi | G11B 21/106 360/77.05 |
| 2002/0063983 A1 * | 5/2002 | Bement | G11B 5/5521 360/31 |
| 2004/0004781 A1 | 1/2004 | Kobayashi et al. | |
| 2007/0223136 A1 * | 9/2007 | Hutsell | G11B 5/556 360/78.05 |
| 2007/0253096 A1 * | 11/2007 | Alfred | G11B 19/045 360/78.04 |
| 2007/0297084 A1 * | 12/2007 | Lee | G11B 5/54 360/75 |
| 2008/0123213 A1 | 5/2008 | Craig et al. | |
| 2009/0059413 A1 * | 3/2009 | Escobar | G11B 5/6064 360/75 |
| 2010/0134919 A1 * | 6/2010 | Wilcox | G11B 5/5552 360/77.07 |

FOREIGN PATENT DOCUMENTS

| | | |
|---|---|---|
| CN | 1606066 A | 4/2005 |
| CN | 108630237 A | 10/2018 |
| CN | 108806727 A | 11/2018 |
| CN | 108962288 A | 12/2018 |

\* cited by examiner

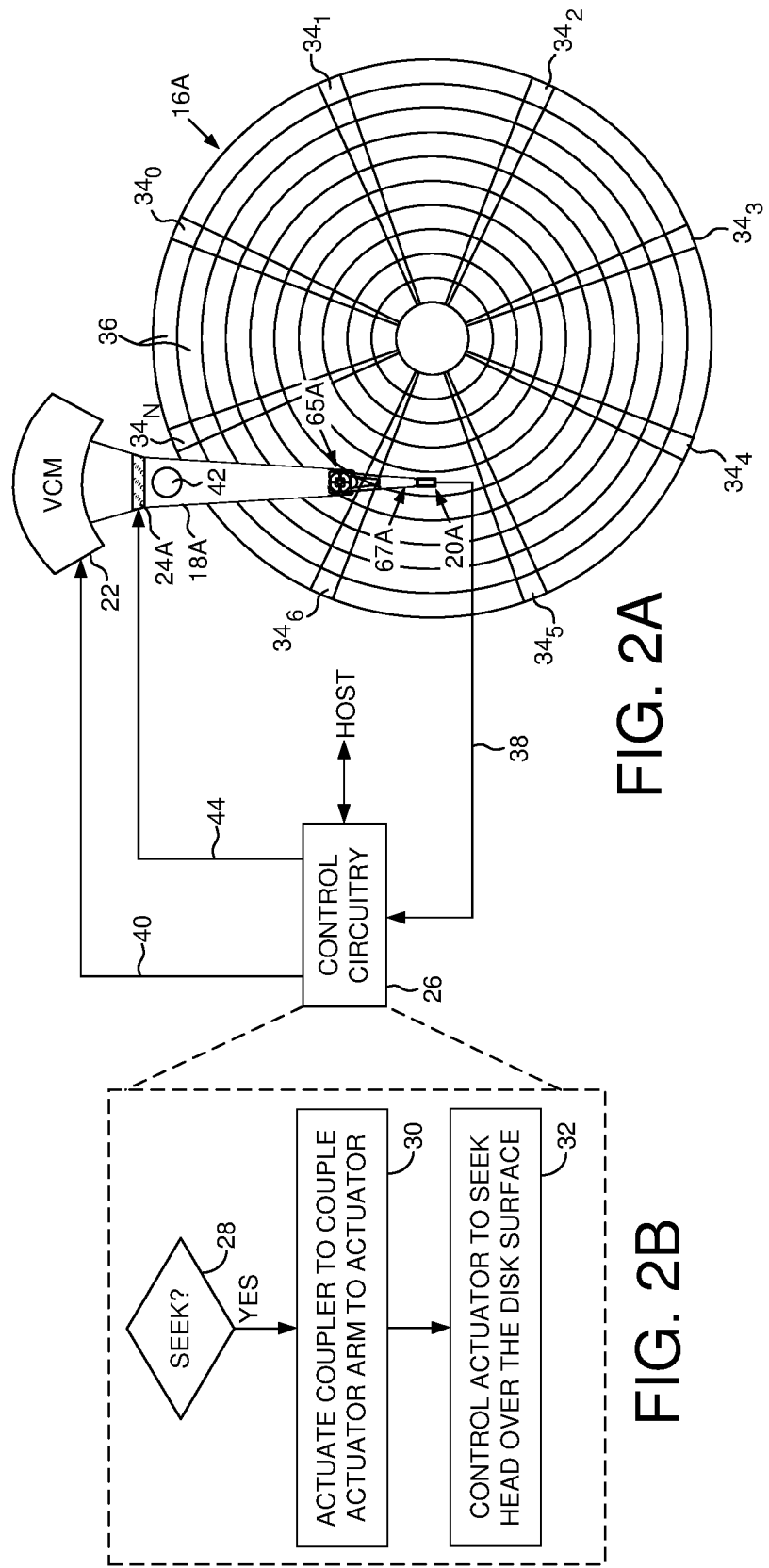

DATA STORAGE DEVICE COUPLING/DECOUPLING ACTUATOR ARM TO/FROM AN ACTUATOR

CROSS REFERENCE TO RELATED APPLICATIONS

This application is a divisional of U.S. patent application Ser. No. 16/750,329 filed on Jan. 23, 2020 which claims priority to U.S. Provisional Patent Application Ser. No. 62/814,393, filed on Mar. 6, 2019, which are hereby incorporated by reference in their entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive comprising a head actuated over a disk surface by an actuator arm, and a coupler configured to couple/decouple the actuator arm to/from a VCM.

FIG. 2B is a flow diagram according to an embodiment wherein the actuator arm is coupled to the VCM in order to seek the head over the disk surface.

DETAILED DESCRIPTION

Figure 1:
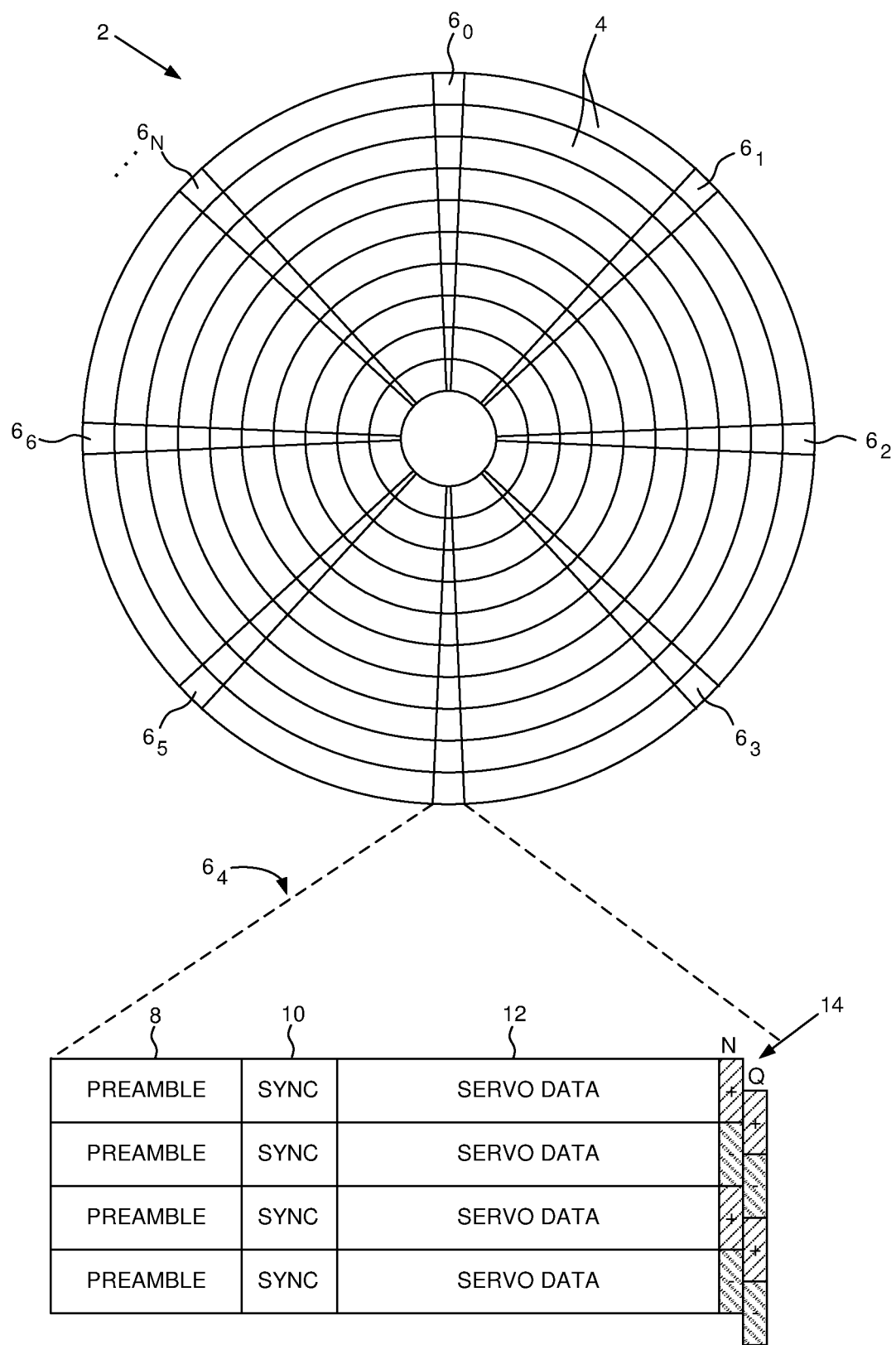
FIG. 1 shows a prior art disk format comprising a plurality of servo tracks defined by servo sectors.

FIG. 2A shows a data storage device in the form of a disk drive according to an embodiment comprising a first disk surface 16A, a first actuator arm 18A, a first head 20A connected to a distal end of the first actuator arm 18A, an actuator 22, and a first coupler 24A configured to couple the first actuator arm 18A to the actuator 22. The disk drive further comprises control circuitry 26 configured to execute the flow diagram of FIG. 2B, wherein to seek the first head (block 28) the first coupler is actuated in order to couple the first actuator arm to the actuator during at least part of the seek interval (block 30), and while the first actuator arm is coupled to the actuator, moving the actuator in order to seek the first head over the first disk surface (block 32).

In the embodiment of FIG. 2A, the disk surface 16A comprises a plurality of servo sectors $34_0$-$34_N$ that define a plurality of servo tracks, wherein data tracks 36 are defined relative to the servo tracks at the same or different radial density. The control circuitry 26 processes a read signal 38 emanating from the head 20A to demodulate the servo sectors and generate a position error signal (PES) representing an error between the actual position of the head and a target position relative to a target track. A servo control system in the control circuitry 26 filters the PES using a suitable compensation filter to generate a control signal 40 applied to a VCM 22 which rotates the actuator arm 18A about a pivot 42 in order to actuate the head radially over the disk in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the control circuitry 26 generates a control signal 44 applied to the first coupler 24A in order to couple/decouple the first actuator arm 18A to/from the VCM 22 in order to seek the first head 20A over the first disk surface 16A. As described in the embodiments below, the first actuator arm 18A may be coupled/decoupled to/from the VCM 22 for any suitable reason, such as to increase the stroke of the actuator arm, or to position multiple heads at or near target radial locations corresponding to access commands queued in a command queue. Any suitable control signal 44 may be applied to the first coupler 24A, such as a current or voltage for actuating a suitable actuator.

Figure 3A:
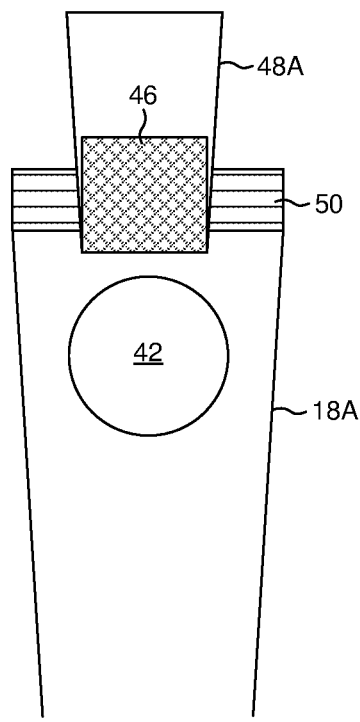
FIGS. 3A-3C show an embodiment wherein the coupler comprises an electromagnetic coupler.
Figure 3B:
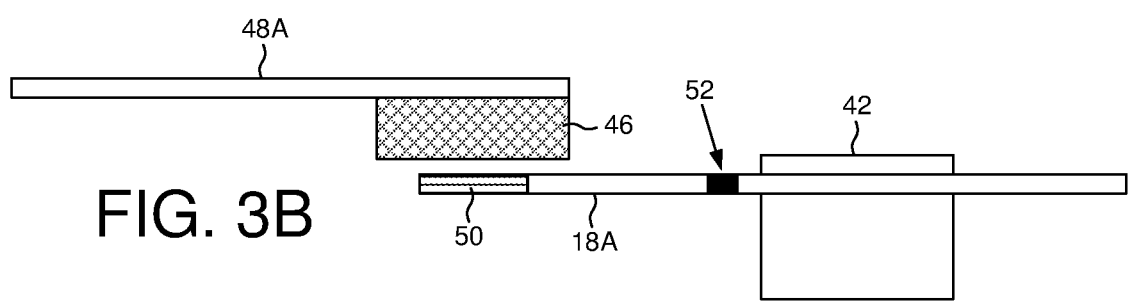
Figure 3C:
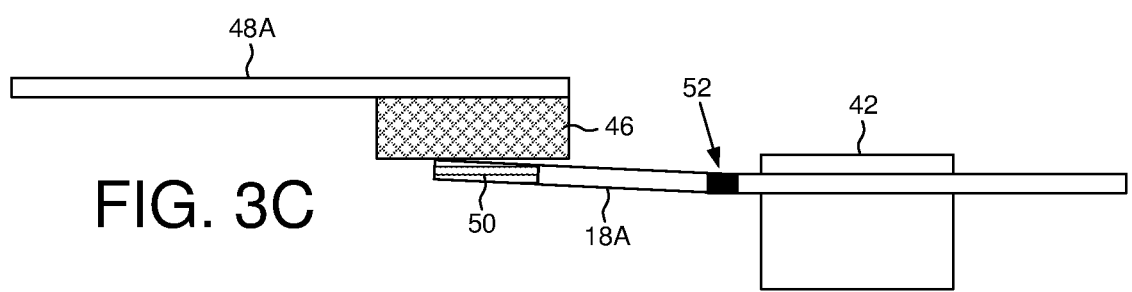

FIGS. 3A-3C shows an embodiment wherein the first coupler 24A comprises an electromagnetic coupler comprising a permanent magnet 46 attached to a first VCM arm 48A, and an electromagnet 50 attached to a proximal end of the actuator arm 18A. In this embodiment, the first actuator arm 18A is decoupled from the first VCM arm 48A when the electromagnet 50 is turned off (not energized with current) as shown in FIG. 3B, and the first actuator arm 18A is coupled to the first VCM arm 48A when the electromagnet 50 is turned on (energized with current) as shown in FIG. 3C. In the embodiment of FIG. 3B, the first actuator arm 18A may comprise a hinge 52 that may also include a spring that biases the electromagnet 50 away from the permanent magnet 46. In one embodiment, a hinge/spring action of the first actuator arm 18A may be implemented by a flexure property of the first actuator arm 18A. In the embodiment of FIG. 3B, the actuator arm 18A may bend sufficiently such that the electromagnet 50 physically contacts the permanent magnet 46 when the electromagnet 50 is turned on. In another embodiment, the first actuator arm 18A may not bend at all (or bend slightly) such that the "coupling" of the first actuator arm 18A to the first VCM arm 48A may occur through the force of the magnetic field when the electromagnet 50 is turned on. In one embodiment, the electromagnet 50 may be turned on/off gradually so as to control the speed of the coupling/decoupling, and in one embodiment described below, the electromagnetic 50 may be controlled so as to effectively servo the respective head over the respective disk surface.

Figure 4A:
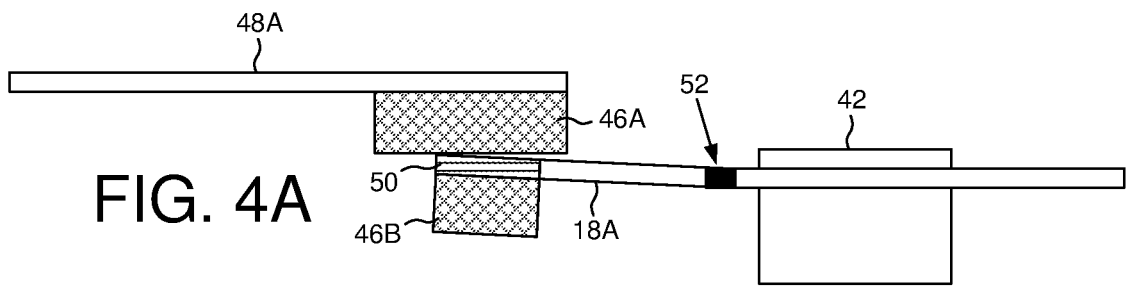
FIGS. 4A-4B show an embodiment wherein permanent magnetics couple the actuator arm to the VCM while an electromagnet is not energized.
Figure 4B:
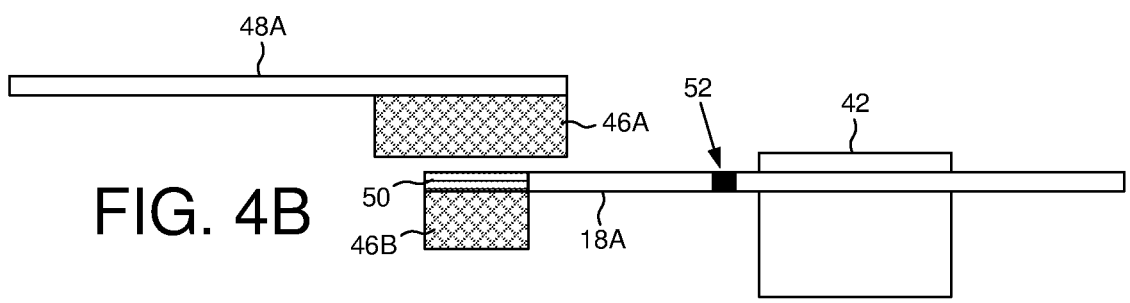

FIGS. 4A-4B show an embodiment wherein the first coupler 24A comprises a first permanent magnet 46A attached to a first VCM arm 48A, and a second permanent magnet 46B attached to the first actuator arm 18A. When the electromagnet 50 is turned off (not energized with current), the force of the first and second permanent magnets 46A and 46B couple the first actuator arm 18A to the first VCM arm 48A as shown in FIG. 4A. When the electromagnet 50 is turned on (energized with current), a magnetic field is generated opposite the magnetic field of the permanent magnets 46A and 46B, thereby decoupling the first actuator arm 18A from the first VCM arm 48A. This embodiment may reduce the power consumption of the first coupler 24A in an embodiment where the first actuator arm 18A may usually be coupled to the first VCM arm 48A. In one embodiment, the "coupling" of the first actuator arm 18A to the first VCM arm 48A may occur through the force of the magnetic field of the permanent magnets 46A and 46B without the first actuator arm 18A physically contacting the first VCM arm 48A.

Figure 5A:
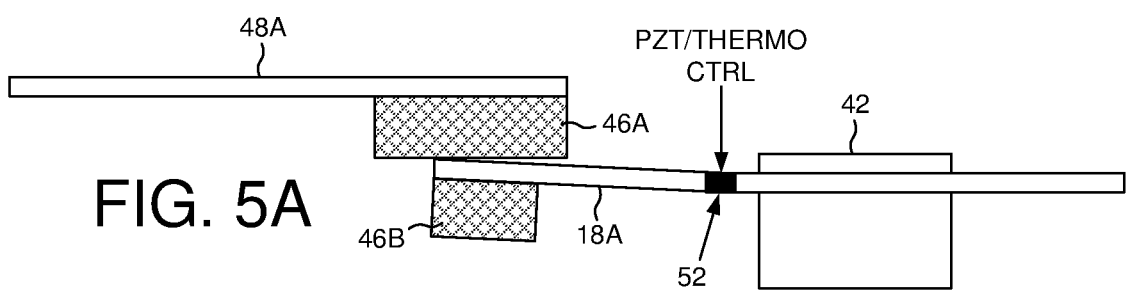
FIGS. 5A-5B show an embodiment wherein the coupler comprises a piezoelectric or thermo coupler.
Figure 5B:
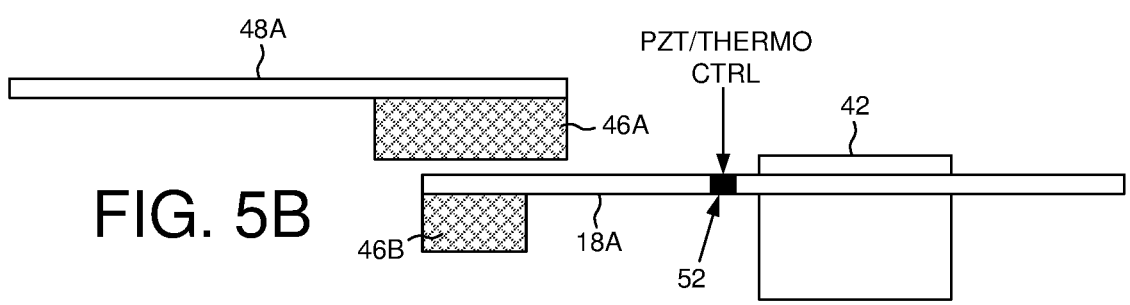

FIGS. 5A-5B show an embodiment wherein the first coupler 24A comprises a suitable hinge actuator integrated into the hinge 52 of the first actuator arm 18A, such as a suitable piezoelectric actuator or a suitable thermo actuator. In the embodiment of FIGS. 5A-5B, the hinge actuator couples the first actuator arm 18A to the VCM arm 48A by "closing" the hinge, and decuples the first actuator arm 18A from the VCM arm 48A by "opening" the hinge. In one embodiment, the closing and opening action of the hinge actuator is implemented by a physical displacement due, for example, to a piezoelectric or thermo effect of the hinge actuator when applying a suitable control signal (e.g., current or voltage) to the hinge actuator.

Figure 6:
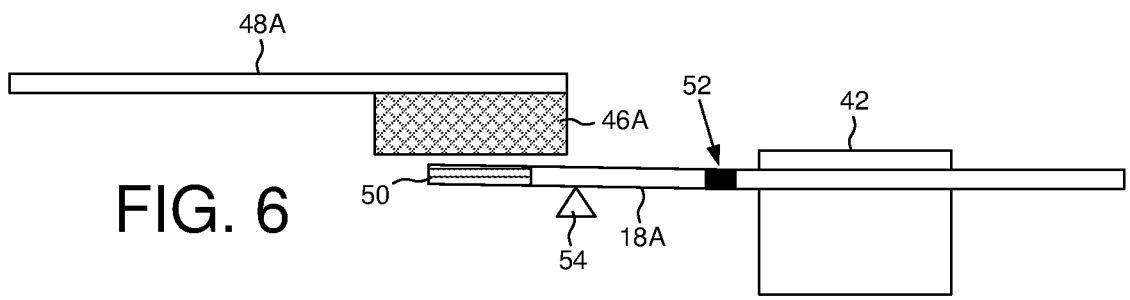
FIG. 6 shows an embodiment wherein the actuator arm is pressed against a stopper while decoupled from the VCM.

FIG. 6 shows an embodiment wherein when the first actuator arm 18A is decoupled from the first VCM arm 48A, a stopper 54 engages the first actuator arm 18A so that the first actuator arm relative to the first disk surface 16A remains substantially fixed rather than allowed to drift. In one embodiment described below, the first actuator arm 18A may be decoupled from the VCM arm 48A when the first head 20A reaches a target access command on the first disk surface. In another embodiment described below, while the stopper engages the first actuator arm 18A, a secondary actuator may be used to servo the first head 20A in order to execute a target access command on the first disk surface while enabling the VCM to concurrently seek a different actuator arm. Any suitable stopper 54 may be employed in the embodiments, such as a physical stopper (e.g., a rubber stopper) that physically engages the first actuator arm 18A. In another embodiment, the stopper 54 may comprise a fixed permanent magnet and an electromagnet forming an electromagnetic coupler similar to the coupler 24A that couples the first actuator arm 18A to the first VCM arm 48A.

Any suitable coupler configuration may be employed to couple the first actuator arm 18A to the VCM 22 in order to seek the first actuator arm 18A. In one embodiment, the VCM 22 shown in FIG. 2A may be configured to rotate a shaft integrated with the pivot 42, and the first actuator arm 18A may be coupled/decoupled to the rotating shaft using a suitable clutching mechanism, which may operate, for example, based on electromagnetic actuation, piezoelectric actuation, thermo actuation, etc. In one embodiment, the rotating shaft may be housed within a fixed cylinder that may operate as the stopper when the first actuator arm 18A is decoupled from the rotating shaft. For example, the clutching mechanism may be actuated to engage the fixed cylinder when the first actuator arm 18A is decoupled from the rotating shaft, thereby fixing the radial location of the first actuator arm 18A relative to the first disk surface 16A.

Figure 7:
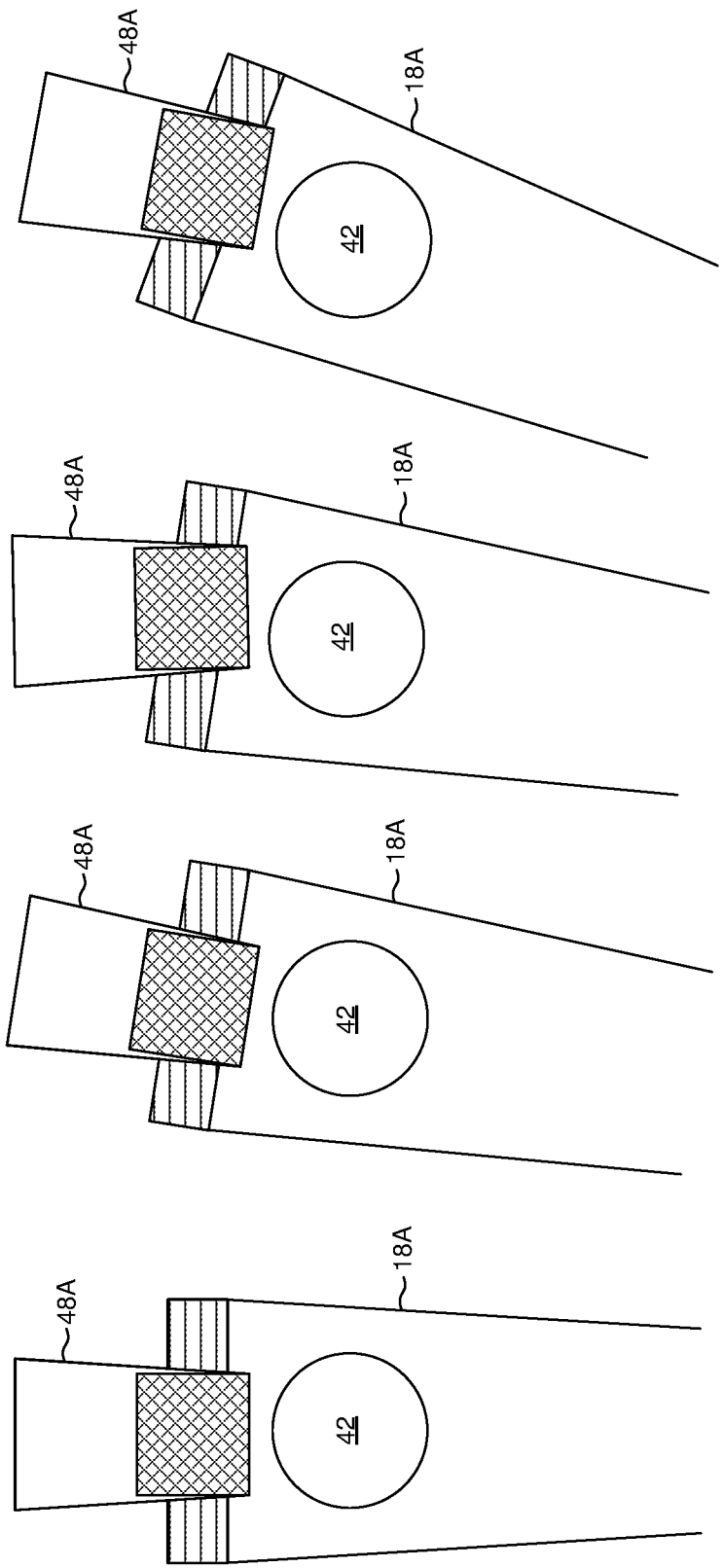
FIGS. 7A-7D show an embodiment wherein coupling/decoupling the actuator arm to/from the VCM increases a stroke of the actuator arm.

The first actuator arm 18A may be coupled/decoupled to/from the VCM 22 for any suitable reason. FIGS. 7A-7D show an embodiment wherein coupling/decoupling the first actuator arm 18A to/from the VCM 22 increases the stroke of the first actuator arm 18A using a limited stroke VCM 22 which may reduce the cost of the VCM 22. In the example of FIGS. 7A-7D, the VCM 22 seeks the first actuator arm 18A toward the outer diameter of the disk over multiple actuations. During the first actuation shown in FIG. 7B, the first actuator arm 18A is rotated about the pivot 42 over a first stroke of the VCM 22. The first actuator arm 18A is then decoupled from the first VCM arm 48A while the VCM 22 repositions to the middle of its stroke as shown in FIG. 7C. The first actuator arm 18A is again coupled to the first VCM arm 48A and the VCM 22 again actuated in order to further rotate the first actuator arm 18A about the pivot 42. This coupling-rotate-decoupling process may be iterated any number of times in order to achieve the full stroke of the first actuator arm 18A, wherein the number of iterations may be based on the ratio of the full stroke of the first actuator arm 18A to the full stroke of the VCM 22.

Figure 8:
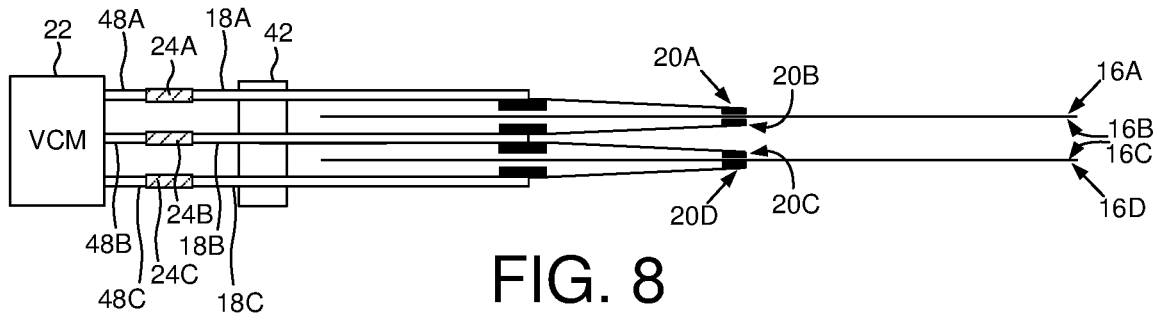
FIG. 8 shows an embodiment wherein the disk drive comprises multiple disk surfaces and a respective head actuated over each disk surface by coupling/decoupling a respective actuator arm to/from the VCM.
Figures 9A, 9B, 9C, 9D:
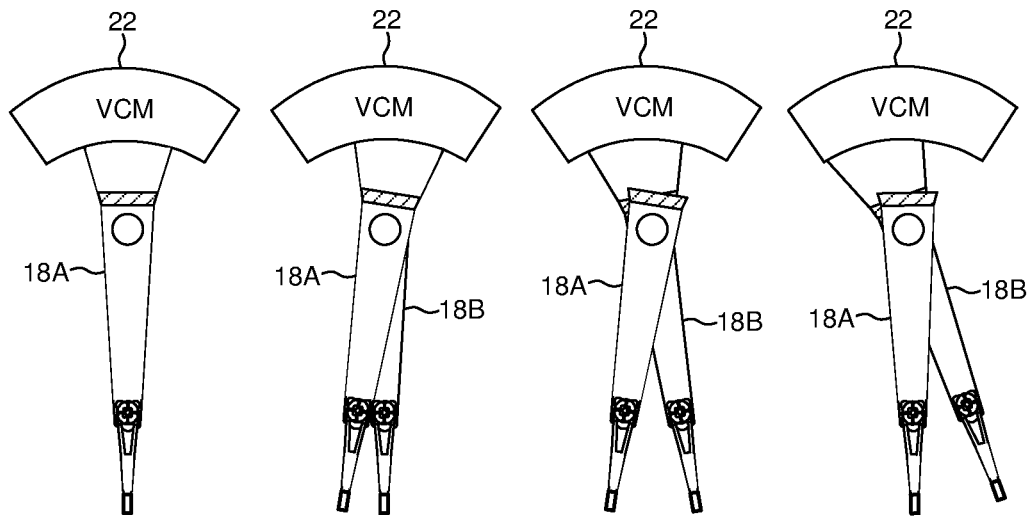
FIGS. 9A-9D show an embodiment wherein the actuator arms may be selectively coupled to the VCM based on target access commands on each disk surface.

FIG. 8 shows an embodiment wherein the disk drive comprises a plurality of disk surfaces 16A-16D and a plurality of actuator arms 18A-18C configured to actuate a head 20A-20D radially over each disk surface. Each actuator arm 18A-18C is selectively coupled/decupled to/from a respective VCM arm 48A-48C by respective couplers 24A-24C in order to selectively actuate one or more of the actuator arms during a seek operation so as to service access commands on each disk surface. FIGS. 9A-9D illustrate an example of this embodiment for two of the actuator arms 18A and 18B, wherein in FIG. 9A both actuator arms are positioned at the middle diameter of the disk surfaces. In FIG. 9B, the first actuator arm 18A is coupled to the first VCM arm 48A in order to seek the first head 20A toward an outer diameter (OD) of the first disk surface. In FIG. 9C, the second actuator arm 18B is coupled to the second VCM arm 48B in order to seek the second head 20B toward an inner diameter (ID) of the second disk surface. In FIG. 9D, the first and second actuator arms 18A and 18B are coupled to the first and second VCM arms 48A and 48B in order to seek the first and second heads 20A and 20B toward the inner diameter of their respective disk surfaces. Accordingly, in this embodiment the actuator arms 18A-18B may be selectively coupled to the VCM arms during seek operations so that the respective heads may be positioned at (or nearer to) target access commands on the respective disk surfaces.

Figure 10:
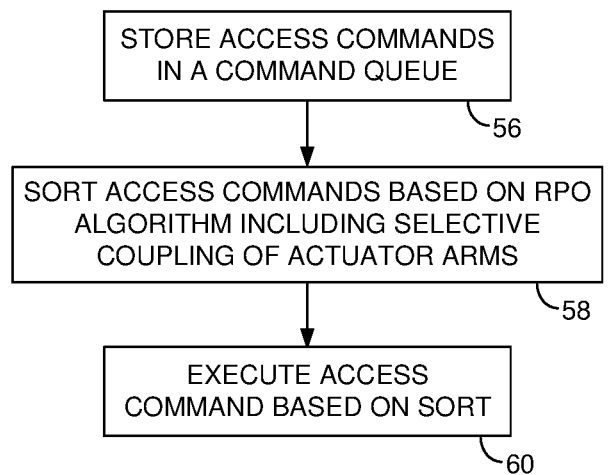
FIG. 10 is a flow diagram according to an embodiment wherein access commands stored in a command queue are sorted for execution based on the selective coupling of the actuator arms to the VCM.

FIG. 10 is a flow diagram according to an embodiment wherein a plurality of access commands (e.g., received from a host) may be stored in a command queue (block 56). The access commands stored in the command queue are then sorted based on a sort algorithm that includes the selective coupling of the actuator arms to the VCM (block 58), and then at least one access command is executed based on the sort (block 60). The sort algorithm may sort the access commands based on any suitable criteria, such as an order that minimizes an access latency (seek and rotational latency) of the heads, and/or an order that optimizes the power consumption of the disk drive. For example, the sort algorithm may select the access command having the shortest seek as the next command to execute. However, also coupling one or more of the other actuator arms to the VCM during the seek may position the respective heads closer to access commands on the other disk surfaces. In another example, a different access command may be selected as the next command to execute if the resulting seek of the target head as well as other heads that may be coupled to the VCM during the seek provides a more optimal execution order in terms of the overall access latency of all the heads. In yet another embodiment, the number of heads that may be coupled to the VCM during a seek may be limited in order to limit the power consumed by the disk drive during the seek, which may affect the execution order of the access commands as configured by the sort algorithm.

Figure 11:
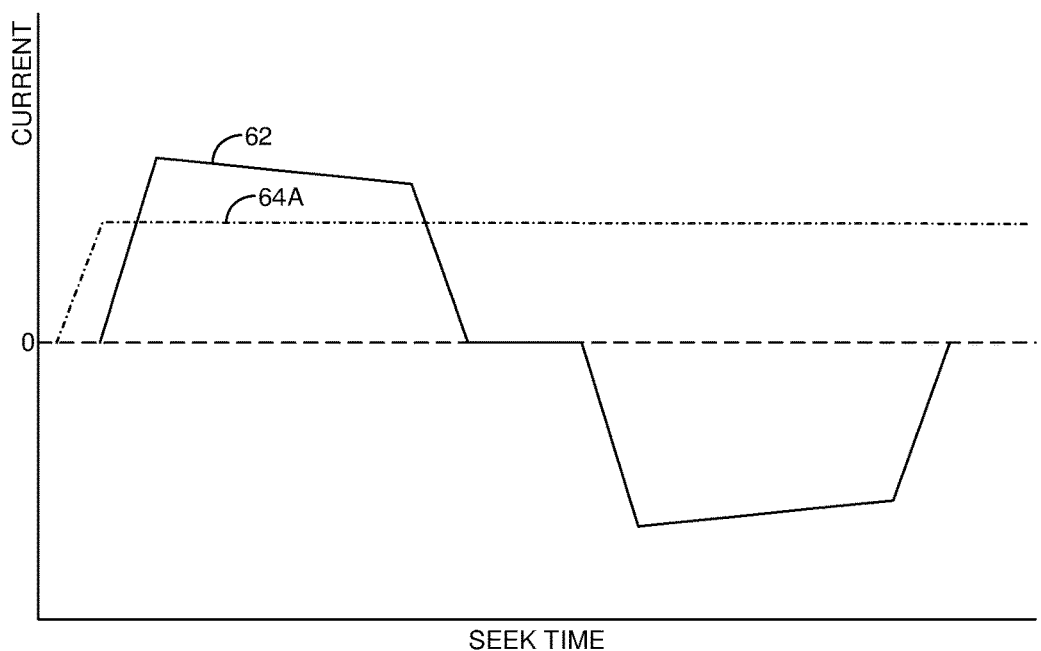
FIG. 11 shows an embodiment wherein after seeking the head to a target data track the actuator arm remains coupled to the VCM while accessing the disk surface.

FIG. 11 shows the current profiles for a current 62 applied to the VCM 22 and a current 64A applied to the first coupler 24A during an acceleration phase, constant velocity phase, and deceleration phase of a seek operation. In this embodiment, the current 64A is applied to the first coupler 24A in order to couple the first actuator arm 18A to the first VCM arm 48A prior to accelerating the first actuator arm 48A. Also in this embodiment, the first actuator arm 18A remains coupled the first VCM arm 48A after the seek operation so that the VCM 22 servos the first head 20A over the first disk surface 16A during a tracking operation while accessing the first disk surface 16A (to service an access command).

Figure 12A:
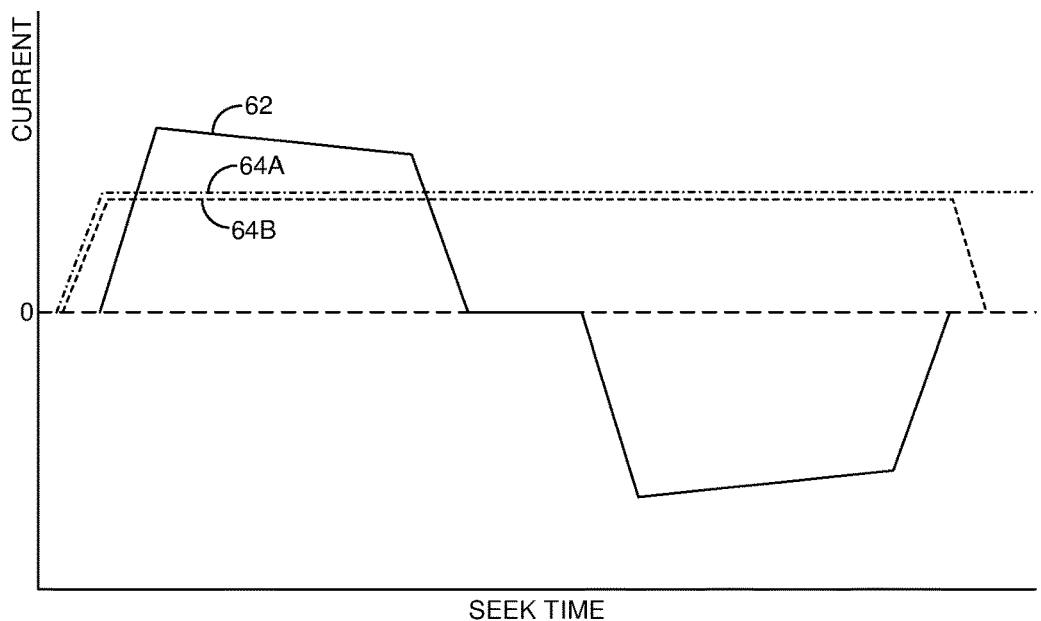
FIGS. 12A-12B show an embodiment wherein two actuator arms may be coupled to the VCM during a seek of a first head in order to position a second head closer to a target access command on the second disk surface.
Figure 12B:
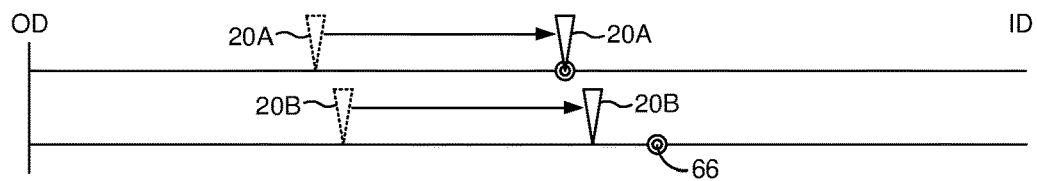

FIGS. 12A and 12B show an embodiment wherein prior to the acceleration phase of the seek operation shown in FIG. 11, a current 64B is applied to a second coupler 24B in order to couple a second actuator arm 18B to a second VCM arm 48B. At the end of the seek operation, the current 64B applied to the second coupler 24B is reduced in order to decouple the second actuator arm 18B from the second VCM arm 48B, thereby reducing the total mass servoed by the VCM 22 during the tracking operation. FIG. 12B illustrates the seek distance traveled by the first head 20A, and the seek distance traveled by the second head 20B during the seek operation. As shown in FIG. 12B, coupling the second actuator arm 18B to the VCM 22 during the seek of the first head 20A moves the second head 20B closer to an access command 66 on the second disk surface, thereby reducing the seek distance (and latency) when the access command 66 is selected for execution by the sort algorithm.

Figure 13A:
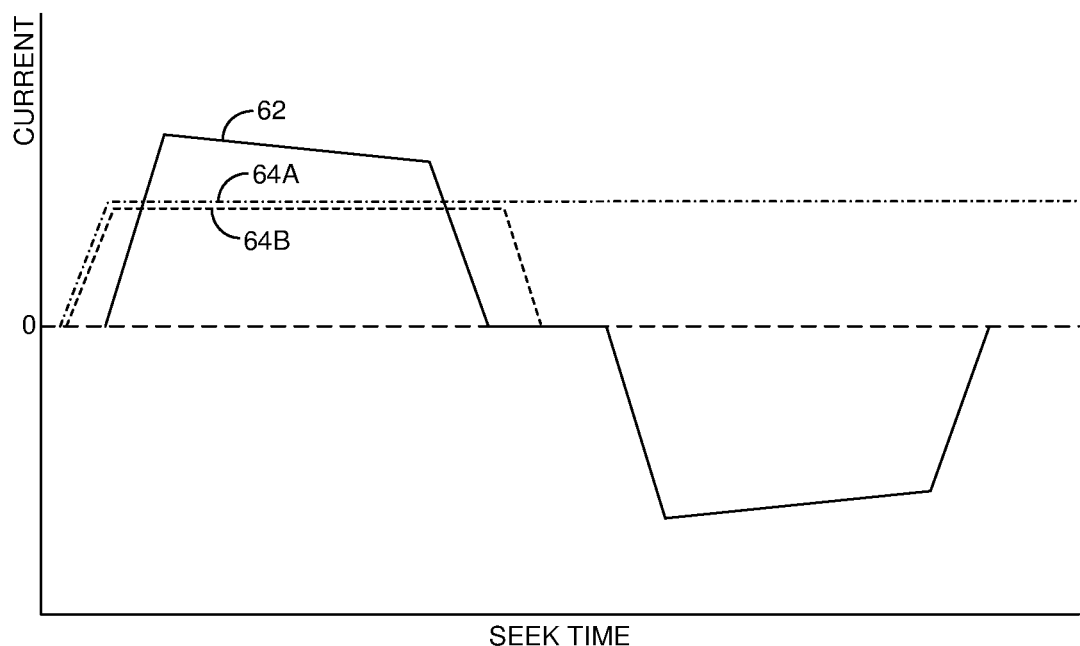
FIGS. 13A-13B show an embodiment wherein the second actuator arm may be decoupled from the VCM during the seek of the first head in order to stop the second head when it reaches the target access command on the second disk surface.
Figure 13B:
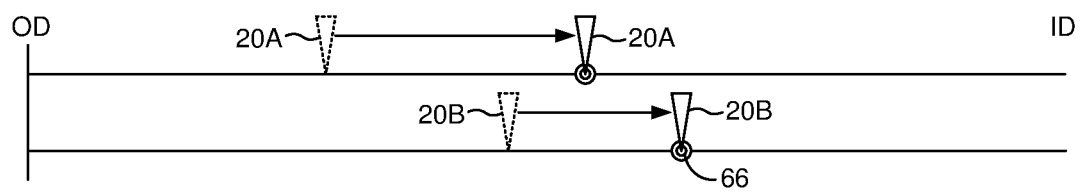

In one embodiment shown in FIGS. 13A and 13B, the current 64B may be reduced during the seek operation (e.g., during the constant velocity phase of the seek) in order to decouple the second actuator arm 18B from the VCM 22 during the seek. As shown in FIG. 13B, decoupling the second actuator arm 18B during the seek may enable the second head 20B to stop at or near the access command 66 on the second disk surface. In one embodiment, the current 64B is reduced in a controlled manner to effectively servo the second head 20B over the second disk surface so that it stops moving when the second head 20B reaches the target data track of the access command 66. For example, in one embodiment the current 64B may be reduced so that the second actuator arm 18B slowly contacts the stopper 54 in FIG. 6, thereby slowly reducing the velocity of the second actuator arm 18B until it stops at the target data track of the access command 66. In other embodiments, more than two actuator arms may be coupled/decoupled to/from the VCM 22 during a seek operation in order to position the respective heads at or near access commands on the respective disk surfaces.

In one embodiment, one or more secondary actuators may be employed to actuate the heads over the respective disk surfaces. For example, in one embodiment a secondary actuator 65A (FIG. 2A) may be used to actuate a suspension 67A that couples the head 20A to the actuator arm 18A and/or a secondary actuator may be used to actuate the head 20A relative to the suspension 67A. Any suitable secondary actuator may be employed, such as a suitable piezoelectric or thermo actuator. In one embodiment, when an actuator arm is decoupled from the VCM and stopped by the stopper, the secondary actuator(s) may be used to servo the head over the disk surface during a tracking operation in order to service an access command. In this embodiment, the VCM may concurrently be seeking other actuator arms in order to seek the other heads over the respective disk surfaces toward other access commands. In this manner, the VCM can be constantly repositioning the inactive heads while the active decoupled head or heads access their respective disk surfaces to service access commands.

Figure 14:
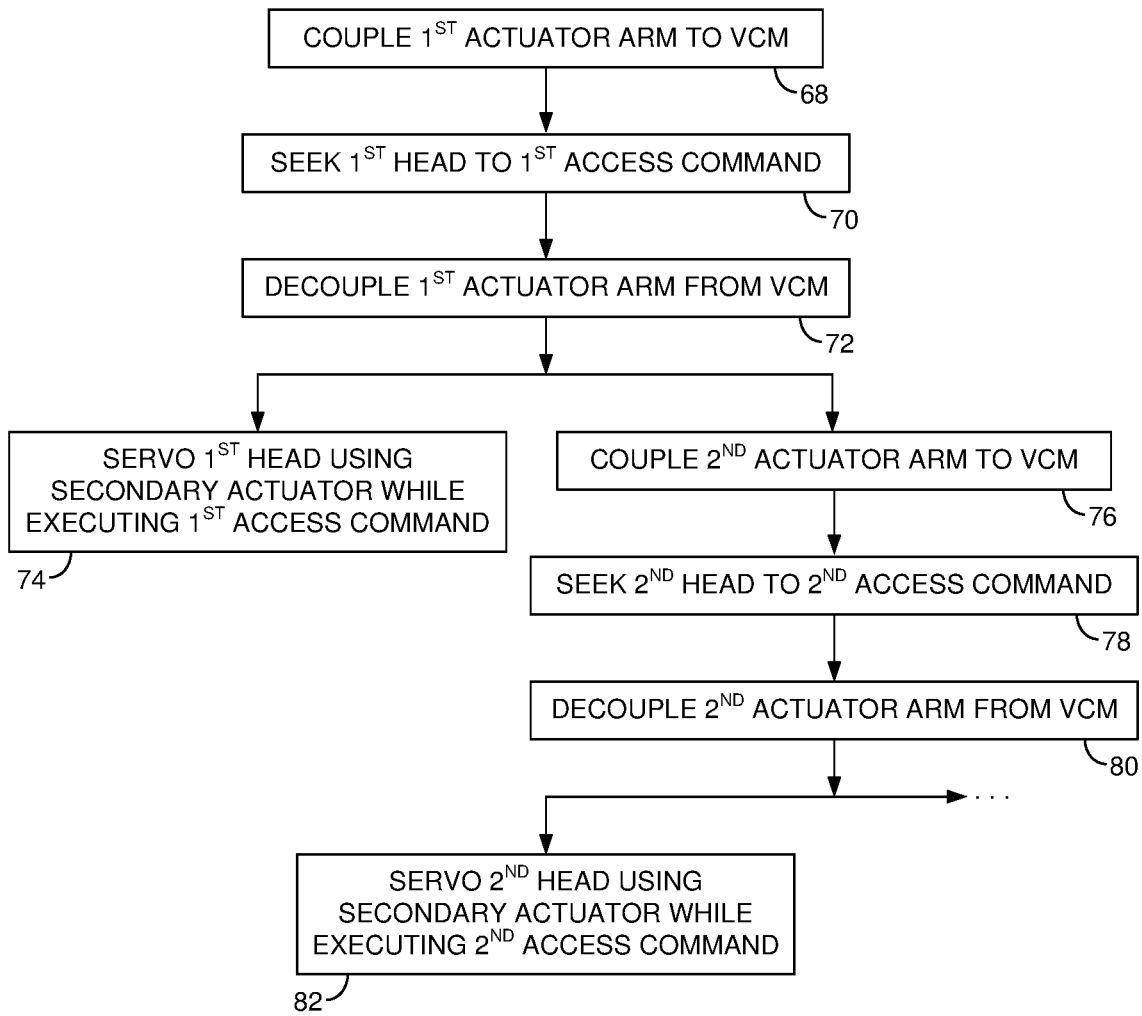
FIG. 14 is a flow diagram according to an embodiment wherein a secondary actuator may be used to servo a head while its actuator arm is decoupled from the VCM in order to service an access command concurrently with the VCM seeking a different actuator arm.

FIG. 14 is a flow diagram that shows an example of this embodiment, wherein a first actuator arm is coupled to the VCM (block 68) and a seek operation positions the first head over a target data track of a first access command (block 70). At the end of the seek operation, the first actuator arm is decoupled from the VCM (block 72) and the first head is servoed using a secondary actuator(s) while executing the first access command (block 74). Concurrent with the first head servicing the first access command, a second head is coupled to the VCM (block 76) and a seek operation positions the second head over a target data track of a second access command (block 78). At the end of the seek operation, the second actuator arm is decoupled from the VCM (block 80) and the second head is servoed using a secondary actuator(s) while executing the second access command (block 82). Concurrent with the second head servicing the second access command, a third actuator arm may be coupled to the VCM and a seek operation executed to position the third head, and so on. In one embodiment, multiple actuator arms may be coupled to the VCM during a seek operation in order to concurrently position multiple heads over their respective disk surfaces. In yet another embodiment, multiple of the heads may be actively servicing respective access commands using control circuitry capable of concurrently processing multiple write/read signals associated with multiple heads.

Figure 15A:
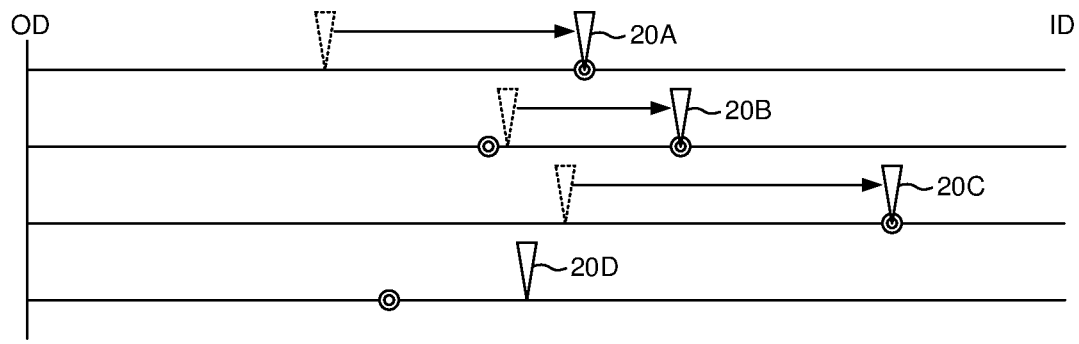
FIGS. 15A-15C show an embodiment wherein the VCM is swept back and forth between the outer diameter (OD) and inner diameter (ID) while picking up and dropping off heads in order to service queued access commands for each disk surface.
Figure 15B:
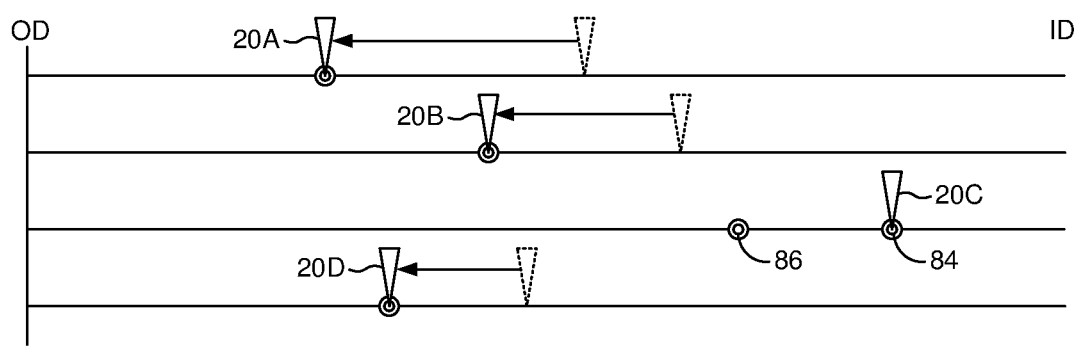

In one embodiment the VCM may be swept back and forth between the ID and OD of its stroke while picking up and dropping off heads in order to service queued access commands for each disk surface. For example, in one embodiment the VCM may have positioned the heads such that the VCM is at or near the OD of its stroke. At this point, the VCM may be reversed so as to accelerate and then move at a substantially constant velocity toward the ID of its stroke as shown in FIG. 15A. As the VCM is moving toward the ID of its stroke, one or more actuator arms may be coupled to the VCM in order to move the respective heads toward access commands. In the example of FIG. 15A, heads 20A, 20B and 20C are moved toward the ID while head 20D is not moved since the only access command on the corresponding disk surface is toward the OD. In this embodiment, the seeking of the VCM may continue until there are no more access commands toward the ID of the disk surfaces that may be reached by any of the heads. At this point, the VCM may be decelerated and then a seek executed in the reverse direction in order to seek the VCM back toward the OD of the disk while picking up and dropping off heads at respective access commands as shown in FIG. 15B. This embodiment may help minimize the access latency and/or power consumption of the VCM since the VCM is always executing full stroke (or near full stroke) seeks as compared to executing numerous shorter seeks.

Figure 15C:
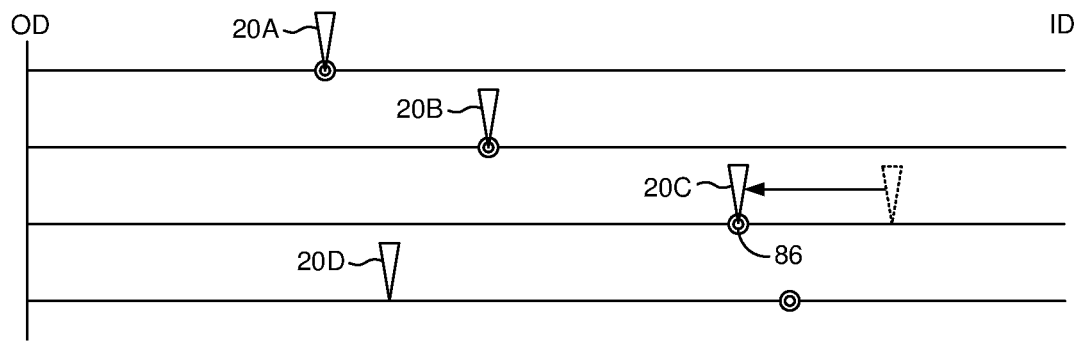

FIG. 15C illustrates an embodiment wherein while seeking the VCM from the ID toward the OD, the head 20C may finish executing a current access command 84 (FIG. 15B). A next access command 86 on the corresponding disk surface is toward the OD of the disk, and so during the seek toward the OD the actuator arm for the head 20C may be coupled to the VCM in order to move the head 20C to the next access command 86. In one embodiment, the VCM may not have enough stroke left for the head 20C to reach the next access command 86; however, the actuator arm for head 20C may still couple to the VCM in order to move the head 20C closer to the next access command 86.

Figure 16A:
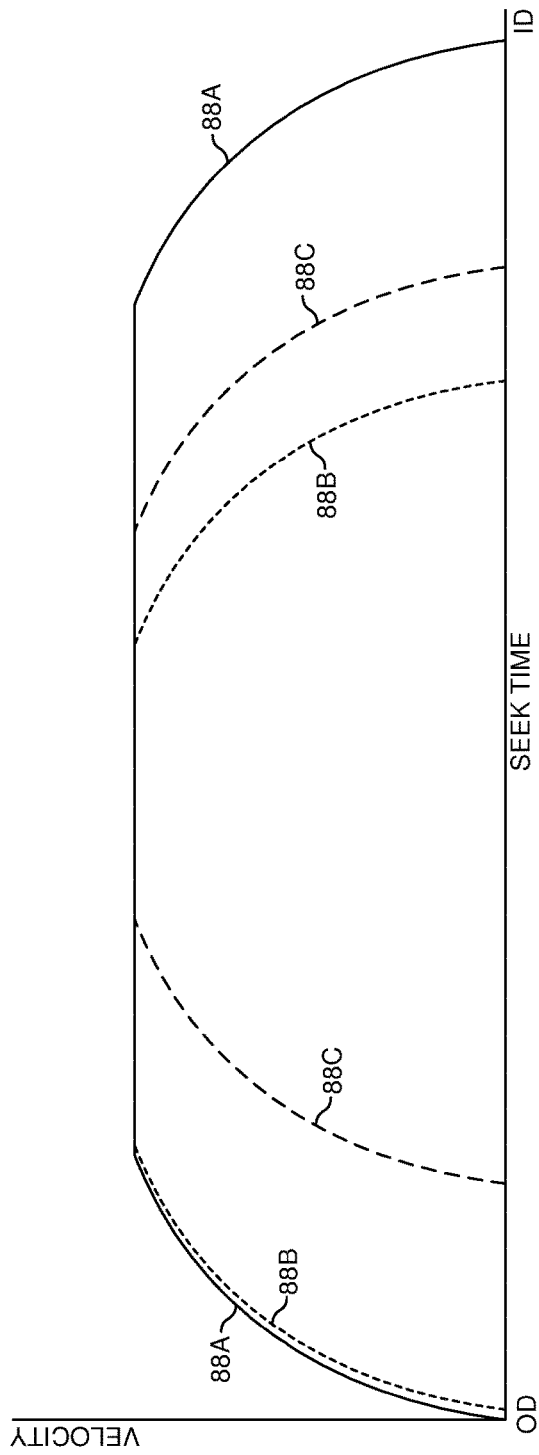
FIG. 16A shows seek profiles for multiple heads that may be coupled/decoupled to/from the VCM as the VCM sweeps through its stroke to thereby position multiple heads over their respective disk surfaces during a single sweep of the VCM.

FIG. 16A shows multiple seek profiles 88A-88C according to an embodiment for multiple heads that may be picked up and dropped off as the VCM sweeps through its stroke during a seek operation. In the example of FIG. 16A, the seek profile 88A may correspond to an access command having the furthest seek distance (e.g., from the OD to ID of the disk surfaces). When executing the seek profile 88A, in this example two heads are coupled to the VCM at the beginning of the seek operation corresponding to seek profiles 88A and 88B. During the constant velocity phase of the seek, a third head is picked up (coupled to the VCM) corresponding to the third seek profile 88C. In one embodiment, the third head may be picked up when a new access command is inserted into the command queue that may be accessed by the third head during the seek operation. In another embodiment, the third head may be coupled to the VCM during the constant velocity phase of the seek operation so as to reduce the power consumed during the acceleration phase of the seek operation. That is, the peak power consumed by the disk drive when seeking multiple heads may be reduced by serially coupling the heads to the VCM during the seek operation. In one embodiment, the sequence for coupling the heads to the VCM may be determined based on the corresponding seek lengths for each head, wherein heads having a shorter seek length may be coupled to the VCM later in the seek operation. As shown in FIG. 16A, each head may be decoupled from the VCM during the seek operation as each head reaches a target access command on the respective disk surface.

Figure 16B:
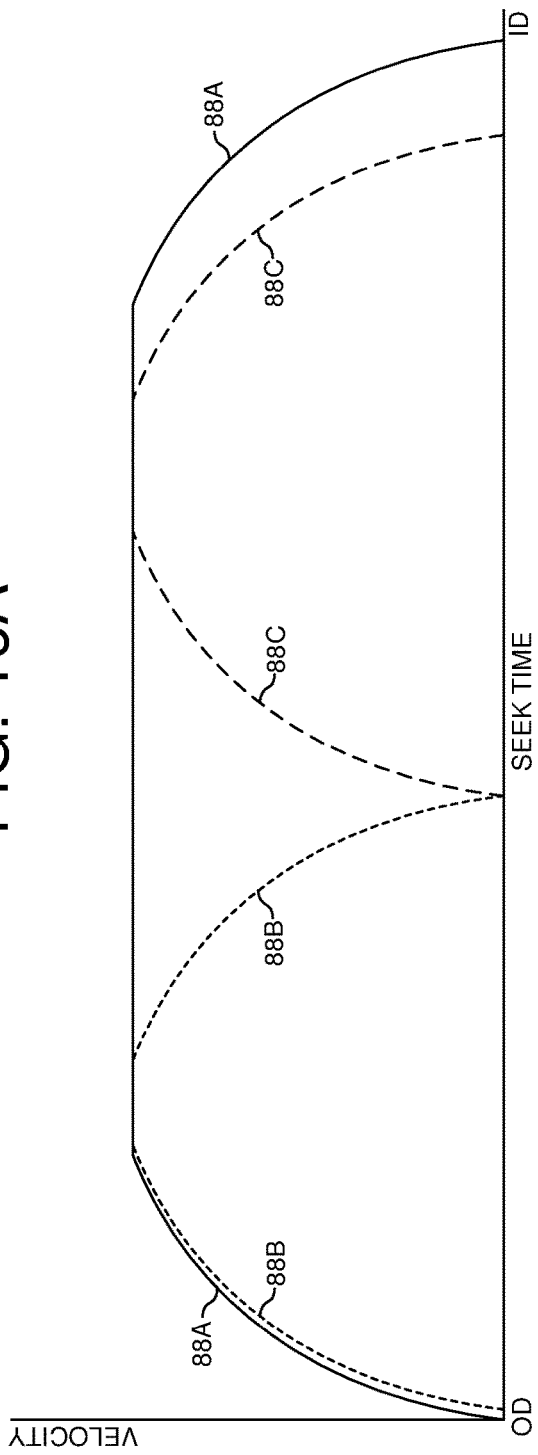
FIG. 16B shows seek profiles for multiple heads that may be coupled/decoupled to/from the VCM as the VCM sweeps through its stroke, wherein the heads may be coupled/decoupled to/from the VCM serially during the sweep in order to limit the peak power consumption of the disk drive.

FIG. 16B shows another embodiment wherein each head may be serially coupled to the VCM in order to reduce the peak power consumed by the disk drive. In this example, at any given time during the seek operation there are at most two heads coupled to the VCM so as to limit the peak power consumption. At the beginning of the seek operation, heads corresponding to seek profiles 88A and 88B are coupled to the VCM. During the constant velocity phase of the VCM, the head corresponding to seek profile 88B is dropped off and the head corresponding to seek profile 88C is picked up.

In one embodiment, the drop off locations for each head may be changed on-the-fly during a sweep seek operation as new access commands are queued in the command queue during the seek operation. For example, in the embodiment of FIG. 16A the seek profile 88A may be extended during the seek operation if a new access command is received for a disk surface that is closer to the ID than the current access command corresponding to the current seek profile 88A. A similar adjustment may be made to the other seek profiles based on new access commands received during the seek operation so as to optimize the execution order of the access commands based on any suitable criteria (e.g., to optimize mechanical latency, power consumption, tail latency, etc.).

In the embodiments described above, the actuator to which the actuator arms are coupled comprises a VCM that may actuate VCM arms such as shown in the embodiment of FIG. 8, or the VCM may rotate a shaft integrated with the pivot 42 as described above. In other embodiments, the actuator arms may be coupled/decoupled to/from a different type of actuator, such as a spindle motor that rotates a shaft integrated with the pivot 42. In yet another embodiment, the actuator arms may be coupled/decoupled to/from a suitable linear actuator. In still another embodiment, the actuator arms may be coupled/decoupled to/from one of multiple actuators. For example, in one embodiment a first VCM may sweep in one direction (e.g., from the OD to ID) while a second VCM may sweep in the opposite direction (e.g., from the ID to OD). Each actuator arm may then be selectively coupled to either the first or second actuator (e.g., VCM) based on the direction of the seek needed to reach the next access command on the corresponding disk surfaces.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk surface;
   a first actuator arm;
   a first head connected to a distal end of the first actuator arm;
   a second disk surface;
   a second actuator arm;
   a second head connected to a distal end of a second actuator arm;
   an actuator;
   a first coupler configured to couple the first actuator arm to the actuator;
   a second coupler configured to couple the second actuator arm to the actuator; and
   control circuitry configured to:
      store a plurality of access commands in a command queue;
      sort the access commands into an execution order based on a selective coupling of the first and second actuator arms to the actuator; and
      execute at least one of the access commands based on the execution order in order to access at least one of the first and second disk surfaces using at least one of the first and second heads.

2. The data storage device as recited in claim 1, wherein the control circuitry is further configured to:
   actuate the first coupler in order to couple the first actuator arm to the actuator;
   move the actuator in order to first seek the first head to a first data track on the first disk surface; and
   after the first seek:
      actuate the first coupler to decouple the first actuator arm from the actuator;
      actuate the second coupler in order to couple the second actuator arm to the actuator; and
      move the actuator in order to second seek the second head to a second data track on the second disk surface.

3. The data storage device as recited in claim 1, wherein the control circuitry is further configured to:
   actuate the first coupler in order to couple the first actuator arm to the actuator;
   move the actuator in order to first seek the first head to a first data track on the first disk surface; and
   during the first seek:
      actuate the second coupler in order to couple the second actuator arm to the actuator; and
      move the actuator in order to second seek the second head to a second data track on the second disk surface.

4. The data storage device as recited in claim 3, wherein during the first seek the control circuitry is further configured to actuate the second coupler in order to decouple the second actuator arm from the actuator.

5. The data storage device as recited in claim 4, wherein during the first seek the control circuitry is further configured to:
   read servo data recorded on at least one of the first or second disk surfaces; and actuate the second coupler in response to the servo data in order to decouple the second actuator arm from the actuator to thereby servo the second head over the second disk surface.

6. A data storage device comprising:
a first disk surface;
a first actuator arm;
a first head connected to a distal end of the first actuator arm;
a second disk surface;
a second actuator arm;
a second head connected to a distal end of a second actuator arm;
an actuator;
a first coupler configured to couple the first actuator arm to the actuator;
a second coupler configured to couple the second actuator arm to the actuator;
a means for storing a plurality of access commands in a command queue;
a means for sorting the access commands into an execution order based on a selective coupling of the first and second actuator arms to the actuator; and
a means for executing at least one of the access commands based on the execution order in order to access at least one of the first and second disk surfaces using at least one of the first and second heads.

7. The data storage device as recited in claim 6, further comprising:
a means for actuating the first coupler in order to couple the first actuator arm to the actuator;
a means for moving the actuator in order to first seek the first head to a first data track on the first disk surface; and
after the first seek:
a means for actuating the first coupler to decouple the first actuator arm from the actuator;
a means for actuating the second coupler in order to couple the second actuator arm to the actuator; and
a means for moving the actuator in order to second seek the second head to a second data track on the second disk surface.

8. The data storage device as recited in claim 6, further comprising:
a means for actuating the first coupler in order to couple the first actuator arm to the actuator;
a means for moving the actuator in order to first seek the first head to a first data track on the first disk surface; and
during the first seek:
a means for actuating the second coupler in order to couple the second actuator arm to the actuator; and
a means for moving the actuator in order to second seek the second head to a second data track on the second disk surface.

9. The data storage device as recited in claim 8, wherein during the first seek further comprising a means for actuating the second coupler in order to decouple the second actuator arm from the actuator.

10. The data storage device as recited in claim 9, wherein during the first seek further comprising:
a means for reading servo data recorded on at least one of the first or second disk surfaces; and
a means for actuating the second coupler in response to the servo data in order to decouple the second actuator arm from the actuator to thereby servo the second head over the second disk surface.

* * * * *